United States Patent
Nagaoka et al.

(10) Patent No.: US 7,751,957 B2
(45) Date of Patent: *Jul. 6, 2010

(54) METHOD OF DETERMINING POSITION OF PORTABLE DEVICE

(75) Inventors: Shuichi Nagaoka, Miyagi-ken (JP); Satoshi Hayasaka, Miyagi-ken (JP); Satoshi Nakajima, Miyagi-ken (JP)

(73) Assignee: Alps Electric Co., Ltd., Tokyo (JP)

(*) Notice: Subject to any disclaimer, the term of this patent is extended or adjusted under 35 U.S.C. 154(b) by 1039 days.

This patent is subject to a terminal disclaimer.

(21) Appl. No.: 11/435,680

(22) Filed: May 17, 2006

(65) Prior Publication Data

US 2006/0267407 A1 Nov. 30, 2006

(30) Foreign Application Priority Data

May 26, 2005 (JP) ............... 2005-154246
Feb. 13, 2006 (JP) ............... 2006-034869

(51) Int. Cl.
*H04Q 1/00* (2006.01)

(52) U.S. Cl. .......................... 701/36; 456/92

(58) Field of Classification Search ............... 701/36; 340/426.16, 425.5, 539.1, 825.69, 10.1, 10.34, 340/10.4, 426.35, 426.36, 539, 825.72; 455/92, 455/99, 69, 70, 134, 152.1, 161.3, 226.2, 455/227

See application file for complete search history.

(56) References Cited

U.S. PATENT DOCUMENTS

| | | | | |
|---|---|---|---|---|
| 6,087,987 A | * | 7/2000 | Bachhuber et al. | 342/457 |
| 6,218,932 B1 | * | 4/2001 | Stippler | 340/426.16 |
| 7,224,980 B2 | * | 5/2007 | Hara | 455/456.1 |
| 2002/0025823 A1 | | 2/2002 | Hara | |

FOREIGN PATENT DOCUMENTS

| | | |
|---|---|---|
| EP | 2 700 625 | 7/1994 |
| EP | 1 184 236 | 3/2002 |
| EP | 1 455 314 | 9/2004 |
| FR | 1 189 306 | 3/2002 |
| FR | 2 834 344 | 7/2003 |

OTHER PUBLICATIONS

European Search Report dated Sep. 22, 2006 for corresponding European Patent Application No. 06009557.7.

* cited by examiner

*Primary Examiner*—Dalena Tran
(74) *Attorney, Agent, or Firm*—Brinks Hofer Gilson & Lione

(57) ABSTRACT

A vehicle controller or a portable controller has a memory that stores an inside data group having information on the intensity of request signals transmitted from a plurality of transmitting antennas when a position of a portable device is the inside of a vehicle, and an outside data group having information on the intensity of request signals transmitted from the plurality of transmitting antennas when the position of the portable device is the outside of the vehicle. The vehicle controller determines whether the information on the intensity of request signals is closer to the inside data group or the outside data group stored in the memory.

14 Claims, 4 Drawing Sheets

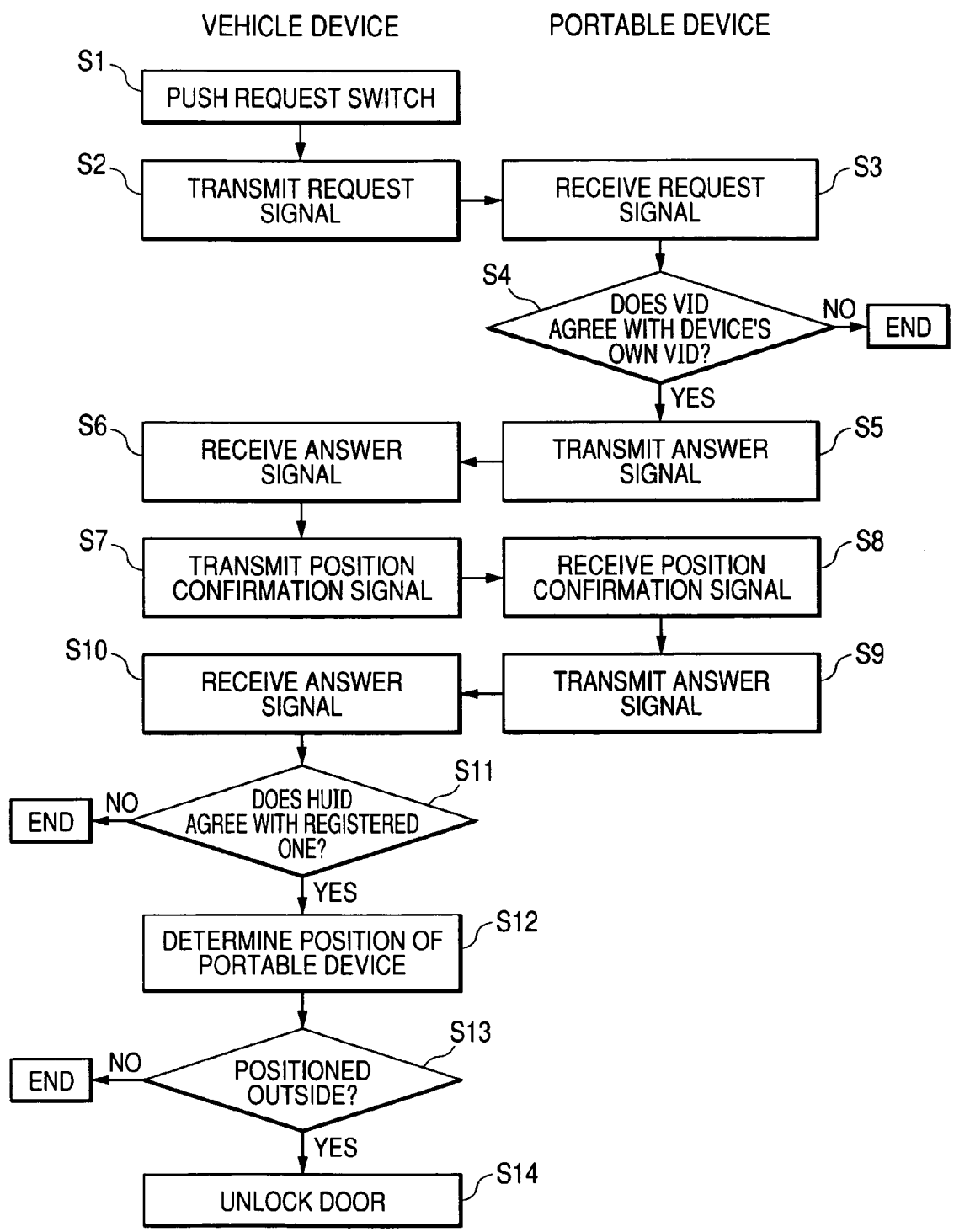

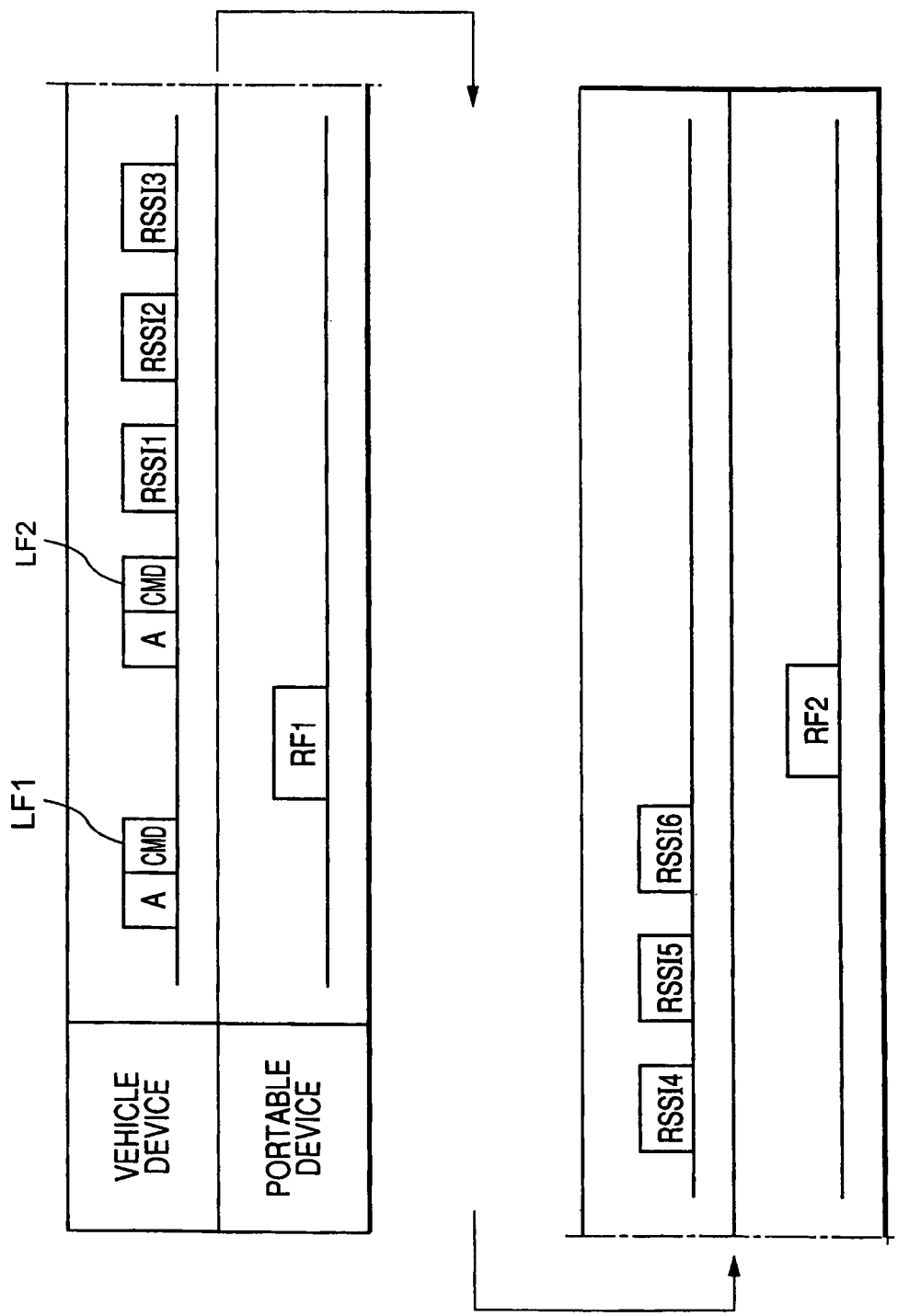

METHOD OF DETERMINING POSITION OF PORTABLE DEVICE

BACKGROUND OF THE INVENTION

1. Field of the Invention

The present invention relates to a keyless entry system apparatus which performs locking and unlocking operations of a door of a vehicle by means of radio communication between a vehicle device and a portable device, more particularly, to a keyless entry system apparatus which can accurately determine whether the portable device is positioned inside or outside of a predetermined interface.

2. Description of the Related Art

Conventionally, there has been provided a keyless entry system apparatus which performs locking and unlocking operations of a door of a vehicle by means of radio communication between a vehicle device and a portable device. In addition, there has been recently provided a passive keyless entry system apparatus which performs locking and unlocking operations of a door of a vehicle, as ID codes preset in each portable device are verified by performing communication between the vehicle device and the portable device when the portable device approaches the vehicle. This kind of keyless entry system is disclosed in, for example, JP-A-2002-77972.

In particular, in the passive keyless entry system apparatus, it is important to determine whether the portable device is positioned inside or outside of the vehicle. For this reason, in the vehicle device, a plurality of transmitting antennas is provided in each place of the vehicle. When the portable device receives radio wave from the transmitting antenna inside the vehicle, it is determined that the portable device is inside the vehicle. When the portable device receives radio wave from the transmitting antenna outside the vehicle, it is determined that the portable device is outside the vehicle.

However, in the keyless entry system apparatus according to the related art, the determination of the position of the portable device is not sufficiently accurate. For example, as a radio wave leaks from the transmitting antenna inside the vehicle, the portable device may incorrectly determine that the portable device is inside the vehicle when the portable device is in fact outside the vehicle. On the contrary, as a radio wave leaks from the transmitting antenna outside the vehicle, the portable device may incorrectly determine that the portable device is outside the vehicle when the portable device is in fact inside the vehicle. When a transmission power of radio wave from the transmitting antenna is weakened to prevent the leakage of the radio wave, the portable device occasionally cannot receive radio wave even though the portable device is inside the vehicle, which may cause incorrect determination.

In JP-A-2002-77972, each of the transmitting antennas of the vehicle detects reception intensity, and an area is determined where the portable device exists, with respect to the reception intensity. However, incorrect determination may occur in this case as well, and thus the determining accuracy of the position of the portable device is not sufficient.

In addition, the determination of the position of the portable device is not limited to the inside and outside of the vehicle, the position of the portable device may be determined whether it is inside or outside of a place separated from a door at a predetermined distance. In this case, for example, it is possible to turn on a lamp when the portable device gets close to the door within the predetermined distance. For this reason, a keyless entry system is required whose determination of the position is not limited to the inside and outside of the vehicle, but may include the inside and outside of a predetermined interface.

SUMMARY OF THE INVENTION

The present invention has been made in view of the drawbacks inherent in the related art, and it is an object of the present invention to provide a keyless entry system apparatus which can accurately determine whether a portable device is positioned inside or outside of a predetermined interface, in addition to determining whether a portable device is positioned inside or outside of a vehicle.

In order to solve the above-described problems, according to a first solving means, there is provided a keyless entry system apparatus, the keyless entry system apparatus includes: a vehicle transmitter having a plurality of transmitting antennas that is provided in a vehicle and transmits a request signal; a vehicle device having a vehicle receiver that receives an answer signal; a portable device having a portable receiver that receives the request signal and a portable transmitter that transmits the answer signal.

The vehicle device has a vehicle controller that performs a predetermined control when the answer signal from the portable device is verified, and the portable device detects the intensity of each signal transmitted from the plurality of transmitting antennas of the vehicle device of the vehicle, and has a portable controller which transmits information on the detected intensity to the portable transmitter of the portable device. The vehicle controller has a memory that stores an inside data group having information on the intensity of signals transmitted from the plurality of transmitting antennas of the vehicle when the portable device is positioned along the inside of the vehicle, and an outside data group having information on the intensity of signals transmitted from the plurality of transmitting antennas of the vehicle when the portable device is positioned along the outside of the vehicle. The vehicle controller determines whether the information on the intensity of signals transmitted from the vehicle that the portable device receives is closer to the inside data group or the outside data group stored in the memory.

According to a second solving means, there is provided a keyless entry system apparatus, the keyless entry system apparatus includes: a vehicle transmitter having a plurality of transmitting antennas that is provided in a vehicle and transmits a request signal; a vehicle device having a vehicle receiver that receives an answer signal; a portable device having a portable receiver that receives the request signal and a portable transmitter that transmits the answer signal. The vehicle device has a vehicle controller that performs a predetermined control when the answer signal from the portable device is verified, and the portable device detects the intensity of each signal transmitted from the plurality of transmitting antennas of the vehicle device of the vehicle, and has a portable controller which transmits information on determination of the position of the portable device to the portable transmitter, on the basis of information on the detected intensity. The portable controller has a memory that stores an inside data group having information on the intensity of signals transmitted from the plurality of transmitting antennas of the vehicle when the portable device is positioned along the inside of the vehicle, and an outside data group having information on the intensity of signals transmitted from the plurality of transmitting antennas of the vehicle when the portable device is positioned along the outside of the vehicle. The portable controller determines whether the information on the intensity of signals transmitted from the vehicle is closer to the inside data group or the outside data group stored in the memory so as to generate information on the determination.

According to a third solving means, there is provided a keyless entry system apparatus, the keyless entry system apparatus includes: a vehicle transmitter that is provided in a vehicle and transmits a request signal; a vehicle device having a vehicle receiver having a plurality of receiving antennas that receive an answer signal; a portable device having a portable receiver that receives the request signal and a portable transmitter that transmits the answer signal. The vehicle device has a vehicle controller that verifies signals from the portable device, and detects the intensity of each signal that the receiving antennas receive. The vehicle controller has a memory that stores an inside data group having information on the intensity of signals that the plurality of receiving antennas receives when the portable device is positioned along the inside of the vehicle, and an outside data group having information on the intensity of signals that the plurality of receiving antennas receives when the portable device is positioned along the outside of the vehicle. The vehicle controller determines whether the information on the intensity of signals that the portable device receives is closer to the inside data group or the outside data group stored in the memory.

According to a fourth solving means, the vehicle controller or the portable controller calculates Mahalanobis distances between the information on the intensity of signals and the inside data group stored in the memory, and between the information and the outside data group, respectively, and determines the data group that the Mahalanobis distance is shorter.

According to a fifth solving means, the memory stores the origin of space coordinates corresponding to the inside data group and the outside data group, respectively, instead of the inside data group and the outside data group, the vehicle controller or the portable controller calculates the Mahalanobis distance between the information on the intensity of the signals and the origin of each space coordinates.

According to a sixth solving means, the vehicle transmitter has the plurality of transmitting antennas transmit signals in a predetermined order and at predetermined time intervals, the signals are transmitted from the vehicle, and the portable controller determines the transmitting antennas on the basis of reception timing of signals transmitted from the vehicle, and detects the intensity of signals transmitted from the vehicle.

According to a seventh solving means, the vehicle controller performs locking and unlocking operations of the vehicle in accordance with the determination of the position of the portable device.

According to an eighth solving means, there is provided a keyless entry system apparatus, the keyless entry system apparatus includes: a vehicle transmitter having a plurality of transmitting antennas that is provided in a vehicle and transmits a request signal; a vehicle device having a vehicle receiver that receives an answer signal; a portable device having a portable receiver that receives the request signal and a portable transmitter that transmits the answer signal. The vehicle device has a vehicle controller that performs a predetermined control when the answer signal from the portable device is verified, and the portable device has a portable controller which detects the intensity of each signal transmitted from the plurality of transmitting antennas of the vehicle device of the vehicle. The vehicle controller or the portable controller has a memory that stores data, the memory stores: a first data group having information on the intensity of signals transmitted from the plurality of transmitting antennas that the portable device receives, when the portable device is positioned along one side of a predetermined interface with respect to the vehicle; first parameters required for comparing the first data group against the information on the intensity; a second data group having information on the intensity of signals transmitted from the plurality of transmitting antennas that the portable device receives, when the portable device is positioned along the other side of the predetermined interface with respect to the vehicle; and second parameters required for comparing the second data group against the information on the intensity. The vehicle controller or the portable controller having the memory determines whether the information on the intensity of signals transmitted from the plurality of transmitting antennas that the portable device receives is closer to the first data group or the second data group by using the first and second data groups or the first and second parameters.

According to a ninth solving means, the predetermined interface with respect to the vehicle is a surface that is separated from a transmitting antenna by a predetermined distance outside the vehicle, the transmitting antenna is provided around a door of the vehicle.

According to a tenth solving means, the vehicle controller or portable controller calculates Mahalanobis distances between the information on the intensity of signals and the first and second data groups, respectively, by using the data groups or the parameters, and determines the data group that the Mahalanobis distance is shorter.

According to the solving means of the invention, the vehicle controller or the portable controller has a memory that stores an inside data group having information on the intensity of request signals transmitted from the plurality of transmitting antennas when the position of the portable device is the inside of the vehicle, and an outside data group having information on the intensity of request signals transmitted from the plurality of transmitting antennas when the position of the portable device is the outside of the vehicle. The vehicle controller or the portable controller determines whether the information on the intensity of request signals is closer to the inside data group or the outside data group stored in the memory, and thus it is statistically determined whether the position of the portable device is inside or outside of the vehicle, on the basis of the information on the intensity of the request signals that the portable device receives. Therefore, it is possible to determine the position accurately.

According to the solving means of the invention, the vehicle controller or the portable controller calculates Mahalanobis distances between the information on the intensity of request signals and the inside data group stored in the memory, and between the information and the outside data group, respectively, and determines the data group that the Mahalanobis distance is shorter. Therefore, it is possible to determine the position accurately.

According to the solving means of the invention, the memory stores the origin of space coordinates corresponding to the inside data group and the outside data group, respectively. Therefore, the Mahalanobis distance can be quickly calculated.

According to the solving means of the invention, the plurality of transmitting antennas transmit request signals in a predetermined order and at predetermined time intervals, respectively. The portable controller determines the transmitting antennas on the basis of reception timing of the request signals, and detects the intensity of the signals. Therefore, it is unnecessary to transmit codes identifying the transmitting antennas for each request signal. Accordingly, it is possible to reduce consumption power and to reliably identify the transmitting antenna.

According to the solving means of the invention, the vehicle controller performs locking and unlocking operations of the vehicle in accordance with the position of the portable device. Therefore, locking and unlocking operations of the door can be prevented from being performed by a person without the portable device.

According to the solving means of the invention, the vehicle controller or the portable controller has a memory that stores data, the memory stores: a first data group having information on the intensity of request signals transmitted from the plurality of transmitting antennas, when the portable device is positioned along one side of a predetermined interface with respect to the vehicle; first parameters; a second data group having information on the intensity of request signals transmitted from the plurality of transmitting antennas, when the portable device is positioned along the other side of the predetermined interface with respect to the vehicle; and second parameters. The vehicle controller or the portable controller determines whether the information on the intensity of request signals is closer to the first data group or the second data group. Therefore, it is possible to accurately determine the portable device is inside or outside of the predetermined interface with respect to the vehicle.

According to the solving means, the predetermined interface with respect to the vehicle is a surface that is separated from a transmitting antenna by a predetermined distance outside the vehicle, the transmitting antenna is provided around the door of the vehicle. Therefore, it is possible to determine whether the portable device gets close to the vehicle within the predetermined distance or not.

According to the solving means, the vehicle controller or portable controller calculates Mahalanobis distances between the information on the intensity of signals and the first and second data groups, respectively, by using the data groups or the parameters, and determines the data group that the Mahalanobis distance is shorter. Therefore, it is possible to determine the position accurately.

BRIEF DESCRIPTION OF THE DRAWINGS

FIG. 5 is a flow chart illustrating an unlocking operation.

FIG. 6 is a chart diagram illustrating signals from the vehicle device and the portable device.

DESCRIPTION OF THE PREFERRED EMBODIMENT

Figure 1:
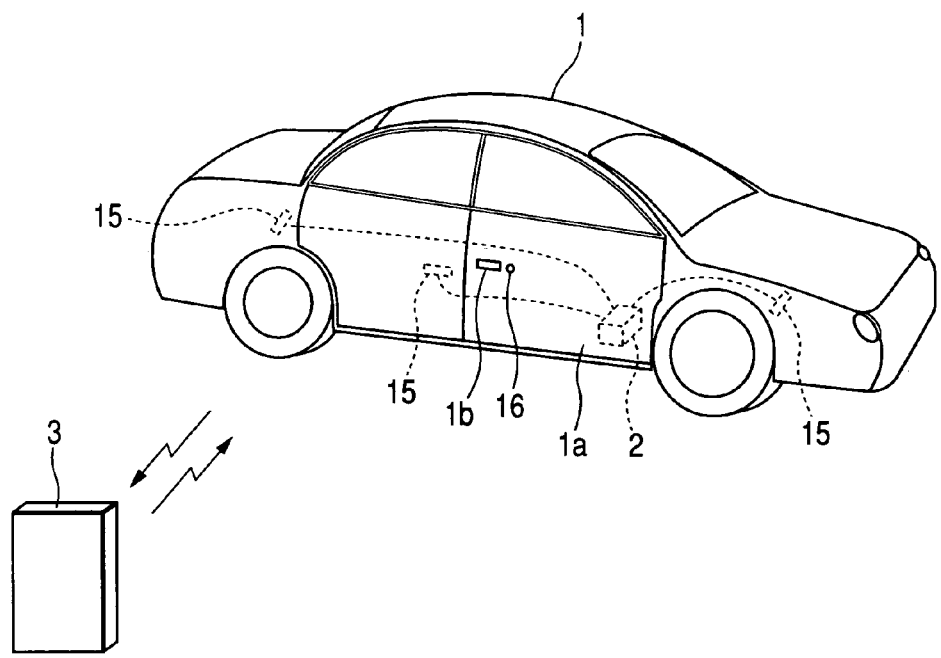
FIG. 1 is a schematic view illustrating a keyless entry system apparatus according to an embodiment of the present invention.

A preferred embodiment of the present invention will be described with reference to the accompanying drawings. FIG. 1 is a schematic view illustrating a keyless entry system apparatus according to the present embodiment. The keyless entry system apparatus according to the present embodiment performs locking and unlocking operations of a door 1a of a vehicle 1, a vehicle device 2 is provided in the vehicle 1, a user carries a portable device 3, and the keyless entry system apparatus sends authentication or locking and unlocking commands by performing communication between the vehicle device 2 and the portable device 3. The vehicle device 2 has a plurality of transmitting antennas 15 in each place of the vehicle 1, a request signal is transmitted to the portable device 3 from each transmitting antenna 15. In addition, a request signal is made of a low frequency signal.

Hereinafter, a case will be described in which a user approaches the vehicle 1 so as to unlock the door 1a. In the present embodiment, in order to have the door 1a unlocked by a user with the portable device 3, it is necessary to press a request switch 16 that is provided in the vicinity of a door knob 1b of the door 1a. When the request switch 16 is pressed, communications, such as authentication, between the vehicle device 2 and the portable device 3 is performed, and the vehicle device 2 unlocks the door 1a when the authentication is completed.

Figure 2:
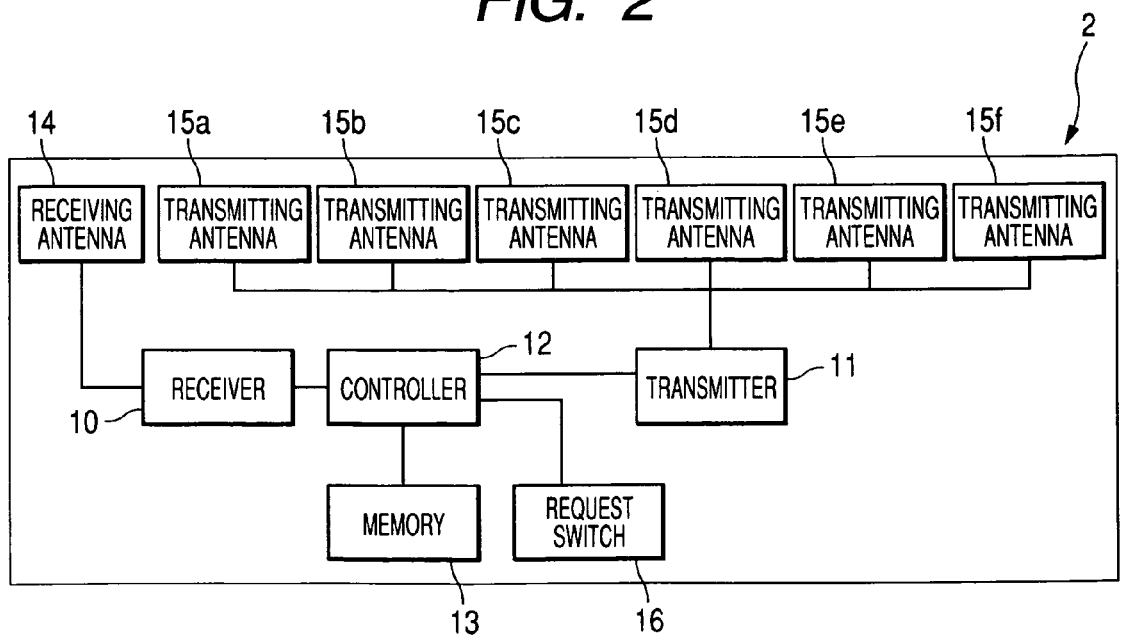
FIG. 2 is a block diagram illustrating a vehicle device.
Figure 3:
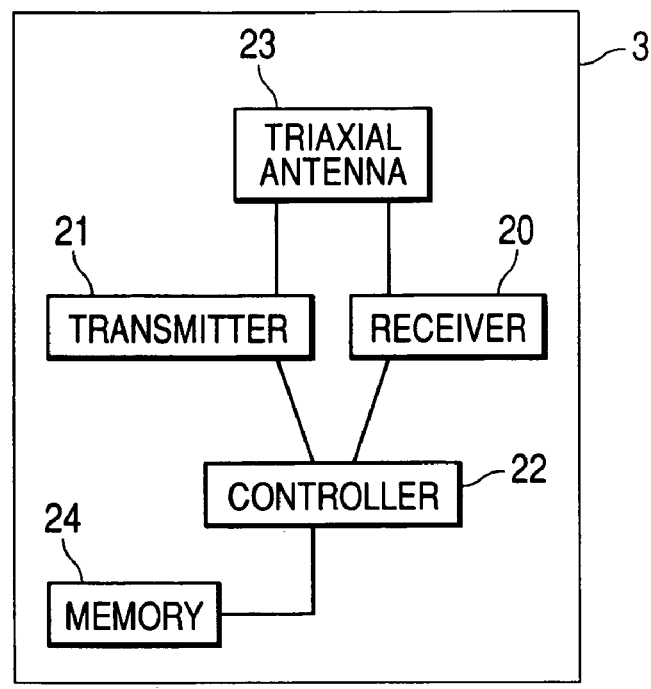
FIG. 3 is a block diagram illustrating a portable device.

Next, the configuration of the vehicle device 2 and the portable device 3 will be described. FIG. 2 shows the configuration of the vehicle device 2, and FIG. 3 shows the configuration of the portable device 3, respectively. As shown in FIG. 2, the vehicle device 2 includes a receiver 10 which receives an answer signal from the portable device 3, a transmitter 11 which transmits a request signal to the portable device 3, a controller 12 which performs various kinds of controlling when receiving an answer signal and when the request switch 16 is pressed.

In addition, the controller 12 is connected to a memory 13 which stores information required for controlling, such as a unique identification code of a vehicle and ID codes of a plurality of portable devices capable of operating one vehicle, and to the above-described request switch 16. Further, the receiver 10 is connected to a receiving antenna 14 for receiving an answer signal, and the transmitter 11 is connected to a plurality of transmitting antennas 15a to 15f for transmitting a request signal. The plurality of transmitting antennas 15a to 15f is provided inside and outside of the vehicle 1, each.

As shown in FIG. 3, the portable device 3 includes a receiver 20 which receives a request signal from the vehicle device 2, a transmitter 21 which transmits an answer signal to the vehicle device 2, a controller 22 which performs various kinds of control when receiving a request signal, a memory 24 which stores ID codes set in the device itself and V-ID or the like. In addition, the receiver 20 and the transmitter 21 are connected to a triaxial antenna 23 which transmits and receives a request signal or an answer signal.

By a wake up signal included in a request signal the receiver 20 receives from the vehicle device 2, the controller 22 changes its mode from a sleep mode which consumes substantially zero power to a normal mode. In addition, the controller 22 performs various kinds of operation on the basis of commands included in a request signal.

Figure 4:
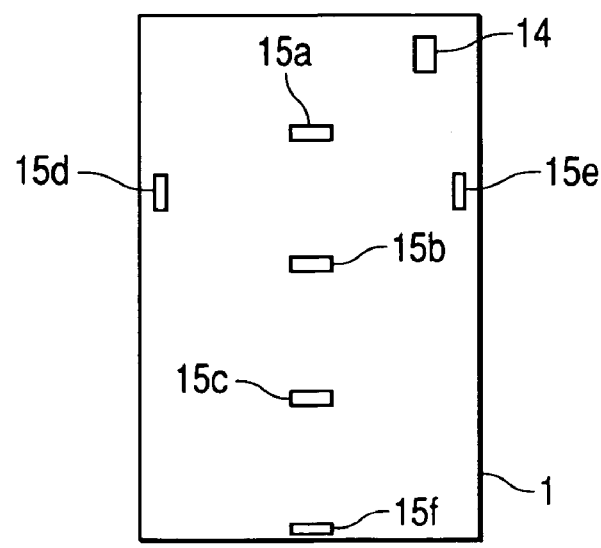
FIG. 4 is a diagram illustrating the position of an antenna provided in a vehicle.

FIG. 4 is a diagram illustrating the arrangement of the receiving antenna 14 and the transmitting antenna 15 provided in the vehicle 1. The receiving antenna 14 is provided in one place inside the vehicle 1, and the transmitting antennas 15 having transmitting antennas 15a to 15f provided inside and outside of the vehicle 1. In the present embodiment, the three transmitting antennas 15a to 15c are provide inside the vehicle 1, and the three transmitting antennas 15d to 15f are provided outside the vehicle 1, respectively.

The memory 13 of the vehicle device 2 stores IDs required for the authentication of the portable device 3, and data for determining the position of the portable device 3. The data for determining the position of the portable device 3 is calculated from an inside data group and an outside data group having data which relates to the radio field intensity from each transmitting antenna 15 to the identification code of the transmitting antenna 15, and an outside data group.

Each data of the inside data group has codes identifying each transmitting antenna 15 and radio field intensity corresponding to the identification codes, with respect to three transmitting antennas 15 whose radio field intensity is larger than the other three antennas, among the radio field intensity from each transmitting antenna 15 provided around the boundary between the inside and outside of the vehicle 1. Such data is obtained beforehand throughout the inside of the entire periphery of the boundary of the vehicle 1. In addition to the inside data group, the outside data group is obtained beforehand throughout the outside the entire periphery of the boundary between the inside and the outside of the vehicle 1. This data is obtained from an actual vehicle 1 by using the portable device 3 or an intensity measuring device, at the time of developing the device. Otherwise, this data can be obtained in a manufacturing line.

When the inside data group and outside data group are obtained, a reference space is obtained by a statistics method introduced by Mahalanobis for each data group, and the origin of space coordinates is calculated for the inside and outside of the vehicle, respectively. These are stored in the memory 13 as data for determining the position of the portable device 3.

When the position of the portable device 3 is determined, the portable device 3 transmits data, having codes identifying each transmitting antenna 15 and radio field intensity corresponding to the identification codes, with respect to the three transmitting antenna 15 whose intensity is larger than the other three antennas. A Mahalanobis distance from the origin of the space coordinates is calculated for the inside data group and the outside data group stored in the memory 13, respectively, on the basis of the data transmitted from the portable device 3. Then, it is determined to which set the Mahalanobis distance is approximated, that is, the Mahalanobis distance is approximated to a smaller one, and it is thus determined that the portable device 3 is positioned at the smaller side.

Next, the operation of the keyless entry system apparatus will be described. FIG. 5 is a flow chart illustrating the operation when the door is unlocked. Further, FIG. 6 is a chart diagram illustrating signals transmitted from the vehicle device 2 and the portable device 3, respectively, with respect to the flow of FIG. 5. In the keyless entry system apparatus according to the present embodiment, the request switch 16 provided in the vehicle 1 is pressed so as to perform radio communication between the vehicle device 2 and the portable device 3, and the door is unlocked. Therefore, a user first presses the request switch 16 of the vehicle 1 so as to start the flow (S1).

When the request switch 16 is pressed, the controller 12 enables the transmitter to transmit a request signal LF1 (S2). As shown in FIG. 6, the request signal LF1 is composed of a signal A including a wake up signal, and a command signal CMD. The command signal CMD includes information of the V-ID (Vehicle-ID) that is a unique identification code.

When the receiver 20 of the portable device 3 receives the request signal LF1, the controller 22 changes its mode from the sleep mode to the normal mode by the wake up signal, and it is determined whether or not the V-ID included in the request signal LF1 matches the device's own V-ID. Here, when the V-ID does not agree with its own V-ID, the flow is terminated. When the V-ID matches its own V-ID, the controller 22 transmits an answer signal RF1 to the transmitter 21 (S5).

When the receiver 10 receives an answer signal RF1 (S6), the controller 12 transmits a position confirmation signal LF2 to the transmitter 11. The position confirmation signal LF2, as shown in FIG. 6, includes a wake up signal as well as the request signal LF1, and is composed of a signal A including the ID of the portable device, a signal including a command signal CMD, and a plurality of Rssi measuring signals consecutively transmitted from the respective transmitting antennas 15a to 15f. In addition, all the transmitting antennas 15a to 15f transmit the signal A.

The Rssi measuring signal transmitted from each transmitting antenna 15a to 15f, as shown in FIG. 6, has a predetermined intensity and a pulse lasting over a predetermined time, is used for measuring the reception intensity of the portable device 3. The transmitter 11 consecutively transmits each Rssi measuring signal to each transmitting antenna 15a to 15f in a predetermined order with a predetermined time interval. Therefore, the portable device 3 can identify from which transmitting antenna 15 the Rssi measuring signal comes, on the basis of the reception timing.

The receiver 20 of the portable device 3 receives the position confirmation signal LF2 including the Rssi measuring signal transmitted from each respective transmitting antennas 15a to 15f (S8). The controller 22 measures the intensity of each Rssi measuring signal, as described above, and transmits an answer signal RF2, including codes identifying each transmitting antenna 15 and intensity data corresponding to the identification codes, to the vehicle device 2, with respect to three data having larger intensity (S9). In addition, when being transmitted to the vehicle device 2, the answer signal RF2 includes an HU-ID that is an ID uniquely preset in each portable device. Further, in measuring the intensity of signals, the method is not limited to transmitting the Rssi measuring signal from the vehicle 1 and then measuring the intensity of the portable device 3. In other words, the intensity of a request signal transmitted from the vehicle 1 can be directly measured.

The transmitter 11 of the vehicle device 2 receives an answer signal RF2 from the portable device 3 (S10). When the transmitter 11 receives the answer signal RF2, the controller 12 determines whether or not the HU-ID of the portable device agrees with one that is registered in the vehicle (S11). Here, when the HU-ID does not agree with the one registered in the vehicle, the flow is terminated at that point. In the meantime, when the HU-ID agrees with the one registered in the vehicle, the process proceeds to determine the position of the portable device 3 (S12).

In transmitting and receiving the request signal LF1, it is fast and simple to identify which portable device 3 is responding, as each portable device 3 transmits an answer signal RF1 with time intervals after the vehicle device 2 transmits the request signal LF1, and then the time intervals are measured. In transmitting and receiving the request signal LF2, a reliable authentication and confirmation of position is performed by using an individual ID of a portable device initially having a larger amount of information on a detected portable device 3 with respect to the request signal LF1. When it is impossible to perform the authentication, the same operation is performed on each portable device 3. Further, the identification of the portable device 3 is omitted in the request signal LF1, the authentication of the portable device 3 or the authentication of each portable device 3 can be performed after transmitting Rssi measuring signals.

As described above, the determination of the position of the portable device 3 is performed by calculating identification codes and intensity data included in an answer signal RF2 transmitted from the portable device 3, and Mahalanobis distances from the origin of the space coordinates for the inside data group and for the outside data group stored in the memory 13, respectively. Then, if the Mahalanobis distance is closer to the origin of the space coordinates for the inside data group, it is determined that the portable device 3 is inside the vehicle 1. On the other hand, if the Mahalanobis distance is closer to the origin of the space coordinates for the outside data group, it is determined that the portable device 3 is outside the vehicle 1.

The controller 12 performs other control in accordance with whether the portable device 3 is inside the vehicle 1 or outside the vehicle 1 (S13). When it is determined that the portable device 3 is not outside the vehicle 1, that is, the portable device 3 is inside the vehicle 1, the flow is terminated as it is.

When the door is unlocked by pressing the request switch 16, the portable 3 is supposed to be outside the vehicle 1. When the door is unlocked while a user is inside the vehicle 1 with the portable device 3, another user without the portable device 3 may unlock the door by pressing the switch 16 as well. To prevent this from happening, when the portable device 3 is inside the vehicle 1, the door is prevented from being unlocked.

In the meantime, when it is determined that the position of the portable device 1 is outside the vehicle 1, a command signal of unlocking is output to a lock (not shown) of the door, and thus the door is unlocked (S14). Since the position of the portable device 3 is determined by calculating Mahalanobis distances from the origin of the space coordinates for the inside data group and for the outside data group, the position can be accurately determined, and thus unlocking malfunction can be reduced.

In the above embodiment, the operation of unlocking the door is performed by pressing the request switch 16. However, the determination of the position of the portable device 3 is performed as well as in the operation of locking the door, and thus controlling can be performed according to results. In addition, not only in locking and unlocking operations of the door, but also in starting an engine in accordance with the position of the portable device 3, the determination of the position of the portable device 3 is performed, and thus controlling can be performed according to the results.

Next, a second embodiment of the invention will be described. In the first embodiment, even though it is determined whether the portable device 3 is inside of the vehicle 1 or outside, the determination of the position is not limited thereto. In the second embodiment, it is determined whether the portable device 3 is inside or outside of an interface distanced from the vehicle by a predetermined length. Here, the determination of the portable device 3 is performed with respect to the interface that distance is 1.5 m from the transmitting antenna 15 provided in a door knob 1b of the vehicle 1.

The configuration of a keyless entry system apparatus according to the present embodiment is substantially the same as that of the first embodiment, as shown in FIGS. 1 to 4. The description of elements corresponding to those of the first embodiment is omitted. The difference of the second embodiment from the first embodiment is the data to be stored in the memory 13 for determining the position of the portable device 3. Hereinafter, the data will be described.

The memory 13 stores parameters that are calculated from a first data group and a data group that is calculated from a second data group. Each data of the first data group obtains data along a surface that is distanced 5 cm toward the vehicle 1 from the interface that is 1.5 m distanced from the transmitting antenna provided in the door knob 1b of the vehicle 1. Here, the data to be obtained is the same as that of the first embodiment, and includes codes identifying each transmitting antenna 15 and intensity data corresponding to the identification codes, with respect to three data having larger intensity. In addition, each data of the second data group obtains data along a surface that is distanced 5 cm away from the vehicle 1 from the interface that is distanced 1.5 m from the transmitting antenna provided in the door knob 1b of the vehicle 1.

Parameters, for calculating a Mahalanobis distance, are calculated from each data group, and then stored in the memory 13. The controller 12 calculates Mahalanobis distances between data from the portable device 3 and the first data group, and between the data and the second data group, respectively, by using the parameters stored in the memory 13, and it is determined whether the portable device 3 is inside of the interface or outside. In other words, it is determined whether the portable device 3 is distanced from the vehicle 1 by more than 1.5 m or less than 1.5 m. The controller 12 also controls in accordance with the results. For example, when it is determined that the portable device 3 is distanced from the vehicle by less than 1.5 m, a light is turned on so as to irradiate an entrance position provided around the door of the vehicle 1. Therefore, it is possible to make it easy for a user to get in the vehicle 1, and to notify the user that the vehicle 1 recognizes the existence of the portable device 3.

In this way, the interface determining the position of the portable device 3 is not limited to an interface interposed between the inside and the outside of the vehicle 1. An arbitrary interface inside or outside of the vehicle can be used as the interface as long as the arbitrary interface is set on the basis of the vehicle 1. In this case, a surface between a driver's seat and a front passenger's seat is set to an interface, and then the first data group is obtained along one side, and the second data group is obtained along the other side, and thus parameters for calculating Mahalanobis distances are calculated. In determining the position of the portable device 3, the controller 12 calculates Mahalanobis distances between data from the portable 3 and the first data group, and between the data and the second data group, respectively. Accordingly, it is determined whether the portable device 3 is inside of the interface or outside. That is, it is determined whether the portable device 3 is in the driver's seat or in the front passenger's seat.

Hereinabove, the preferred embodiments of the present invention have been described. The application of the invention is not limited to the above-described embodiments, it can be modified in various forms within the idea of the present invention. For example, as shown in FIG. 4, in the above-described embodiments, three transmitting antennas 15 are provided inside of the vehicle 1 and the outside, respectively. However, the number and arrangement of the transmitting antenna 15 is not limited to the embodiment as long as more than one transmitting antenna is provided inside of the vehicle 1 and outside, respectively. In fact, it is preferable to provide a plurality of transmitting antennas 15 in order to accurately determine the position. In addition, three data from the transmitting antenna 15, having larger reception intensity, are chosen to use in determining the position. However, the number of transmitting antennas 15 is not limited to three, and all data can be used in determining the position.

In the first embodiment, the controller 12 of the vehicle device 2 calculates the Mahalanobis distances between data from the portable 3 and the inside data group, and between the data and the outside data group, respectively. However, a memory equivalent to the memory 13 is provided in the portable device 3 so as to store the origin of the respective space coordinates for the inside data group and outside data group, and Mahalanobis distances are calculated in the controller 22, and thus the determination of the position of the portable device 3 may be performed. In the second embodiment, the memory 24 of the portable device 3 may store parameters for the first data group and parameters for the second data group, and Mahalanobis distance may be calculated in the controller 22.

The data stored in the memory 13 may not only be the origin of the space coordinates like the first embodiment, but also be the inside data group and the outside data group. In this case, the origin of the space coordinates and Mahalanobis distances are calculated in determining the position of the portable device 3. As well in the second embodiment, the memory 13 may store the first data group and the second data group to calculate Mahalanobis distances. The method of determining the position is not limited to calculating Mahalanobis distances, the method may use a linear determination expression. However, it is preferable to use Mahalanobis distance to accurately determine the position.

Further, in these embodiments, the plurality of transmitting antennas 15 is provided in the vehicle device 2, the intensity of a plurality of Rssi measuring signals is measured by the portable device 3, and the determination of the position of the portable device 3 is performed on the basis of the intensity. However, a plurality of receiving antennas 14 may be provided in the vehicle device 2, then the plurality of receiving antennas 14 may receive signals from the portable device 3 to measure the reception intensity, and then the controller 12 may determine the position of the portable device 3 on the basis of the intensity. At this time, the signal from the portable device 3 includes an answer signal and a signal for measuring the intensity. In this case, data stored in the memory 13 includes the inside data group collecting reception intensity data of the plurality of receiving antennas 14 when the position of the portable device 1 is inside of the vehicle 1, and the outside data group collecting reception intensity data of the plurality of receiving antennas 14 when the position of the portable device 1 is outside of the vehicle 1.

The invention claimed is:

1. A method of determining a position of a portable device in a keyless entry system apparatus comprising a vehicle device including a vehicle transmitter having a plurality of transmitting antennas that is provided in a vehicle and transmits a request signal; a vehicle receiver that receives an answer signal; a portable device having a portable receiver that receives the request signal; and a portable transmitter that transmits the answer signal, wherein the vehicle device has a vehicle controller that performs a predetermined control when the answer signal from the portable device is verified, and the portable device detects the intensity of each signal transmitted from the plurality of transmitting antennas of the vehicle device of the vehicle, and has a portable controller which transmits information on the detected intensity to the portable transmitter of the portable device, and wherein the vehicle controller has a memory, the method comprising the steps of:

storing, in the memory in advance, an inside data group having information on the intensity of signals transmitted from the plurality of transmitting antennas of the vehicle when the portable device is positioned along the inside of the vehicle, and an outside data group having information on the intensity of signals transmitted from the plurality of transmitting antennas of the vehicle when the portable device is positioned along the outside of the vehicle, and determining whether the information on the intensity of signals received by the portable device is closer to the inside data group or the outside data group stored in the memory by the vehicle controller, the signals being transmitted from the vehicle.

2. The method according to claim 1, wherein the vehicle controller or the portable controller calculates Mahalanobis distances between the information based on the intensity of signals and the inside data group stored in the memory, and between the information and the outside data group, respectively, and determines the data group that has a shorter Mahalanobis distance.

3. The method according to claim 2, wherein the memory stores the origin of space coordinates corresponding to the inside data group and the outside data group, respectively, instead of the inside data group and the outside data group, and the vehicle controller or the portable controller calculates the Mahalanobis distance between the information based on the intensity of the signals and the origin of each space coordinates.

4. The method according to claim 1, wherein the vehicle transmitter transmits signals, transmitted from the vehicle in a predetermined order and at predetermined time intervals, to the plurality of transmitting antennas, and the portable controller determines the transmitting antennas on the basis of reception timing of signals transmitted from the vehicle, and detects the intensity of signals transmitted from the vehicle.

5. The method according to claim 1, wherein the vehicle controller performs locking and unlocking operations of the vehicle in accordance with the determination of the position of the portable device.

6. A method of determining a position of a portable device in a keyless entry system apparatus comprising a vehicle device including a vehicle transmitter having a plurality of transmitting antennas that is provided in a vehicle and transmits a request signal; a vehicle receiver that receives an answer signal; a portable device having a portable receiver that receives the request signal; and a portable transmitter that transmits the answer signal, wherein the vehicle device has a vehicle controller that performs a predetermined control when the answer signal from the portable device is verified, and the portable device detects the intensity of each signal transmitted from the plurality of transmitting antennas of the vehicle device of the vehicle, and has a portable controller which transmits information on determination of the position of the portable device to the portable transmitter, on the basis of information on the detected intensity, wherein the portable controller has a memory, the method comprising the steps of:

storing, in the memory in advance, an inside data group having information on the intensity of signals transmitted from the plurality of transmitting antennas of the vehicle when the portable device is positioned along the inside of the vehicle, and an outside data group having information on the intensity of signals transmitted from the plurality of transmitting antennas of the vehicle when the portable device is positioned along the outside of the vehicle, and determining whether the information on the intensity of signals transmitted from the vehicle is closer to the inside data group or the outside data group stored in the memory by the portable controller so as to generate information on the determination.

7. The method according to claim 6, wherein the vehicle controller or the portable controller calculates Mahalanobis distances between the information based on the intensity of signals and the inside data group stored in the memory, and between the information and the outside data group, respectively, and determines the data group that has a shorter Mahalanobis distance.

8. The method according to claim 7,
wherein the memory stores the origin of space coordinates corresponding to the inside data group and the outside data group, respectively, instead of the inside data group and the outside data group, and the vehicle controller or the portable controller calculates the Mahalanobis distance between the information on the intensity of the signals and the origin of each space coordinates.

9. The method according to claim 6,
wherein the vehicle transmitter transmits signals, transmitted from the vehicle in a predetermined order and at predetermined time intervals, to the plurality of transmitting antennas, and the portable controller determines the transmitting antennas on the basis of reception timing of signals transmitted from the vehicle, and detects the intensity of signals transmitted from the vehicle.

10. The method according to claim 6,
wherein the vehicle controller performs locking and unlocking operations of the vehicle in accordance with the determination of the position of the portable device.

11. A method of determining a position of a portable device in a keyless entry system apparatus comprising a vehicle device including a vehicle transmitter that is provided in a vehicle and transmits a request signal; a vehicle receiver having a plurality of receiving antennas that receive an answer signal; a portable device having a portable receiver that receives the request signal; and a portable transmitter that transmits an answer signal,
wherein the vehicle device has a vehicle controller that verifies signals from the portable device, and detects the intensity of each signal that the receiving antennas receive, and wherein the vehicle controller has a memory, the method comprising the steps of:

storing, in the memory in advance, an inside data group having information based on the intensity of signals that the plurality of receiving antennas receives when the portable device is positioned along the inside of the vehicle, and an outside data group having information based on the intensity of signals that the plurality of receiving antennas receives when the portable device is positioned along the outside of the vehicle, and determining whether the information based on the intensity of signals that the portable device receives is closer to the inside data group or the outside data group stored in the memory by the vehicle controller.

12. A method of determining a position of a portable device in a keyless entry system apparatus comprising a vehicle device including a vehicle transmitter having a plurality of transmitting antennas that is provided in a vehicle and transmits a request signal; a vehicle receiver that receives an answer signal; a portable device having a portable receiver that receives the request signal; and a portable transmitter that transmits the answer signal,
wherein the vehicle device has a vehicle controller that performs a predetermined control when the answer signal from the portable device is verified, and the portable device has a portable controller which detects the intensity of each signal transmitted from the plurality of transmitting antennas of the vehicle device of the vehicle, and wherein the vehicle controller or the portable controller has a memory that stores data, the method comprising the steps of:

storing, in the memory in advance, a first data group having information based on the intensity of signals transmitted from the plurality of transmitting antennas that the portable device receives, when the portable device is positioned along one side of a predetermined interface with respect to the vehicle; first parameters required for comparing the first data group against the information on the intensity; a second data group having information on the intensity of signals transmitted from the plurality of transmitting antennas that the portable device receives, when the portable device is positioned along the other side of the predetermined interface with respect to the vehicle; and second parameters required for comparing the second data group against the information on the intensity, the vehicle controller or the portable controller having the memory determines whether the information on the intensity of signals transmitted from the plurality of transmitting antennas that the portable device receives is closer to the first data group or the second data group by using the first and second data groups or the first and second parameters.

13. The method according to claim 12,
wherein the predetermined interface with respect to the vehicle is separated from a transmitting antenna by a predetermined distance outside the vehicle, the transmitting antenna being provided around a door of the vehicle.

14. The method according to claim 12,
wherein the vehicle controller or portable controller calculates Mahalanobis distances between the information on the intensity of signals and the first and second data groups, respectively, by using the data groups or the parameters, and determines the data group that the Mahalanobis distance is shorter.

* * * * *